United States Patent [19]
Bradley et al.

[11] Patent Number: 5,340,485
[45] Date of Patent: Aug. 23, 1994

[54] APPARATUS AND METHOD FOR CLARIFIER SLUDGE COLLECTION

[75] Inventors: Bruce D. Bradley, Salt Lake City; Steven G. Coombs, Layton, both of Utah

[73] Assignee: Baker Hughes Incorporated, Houston, Tex.

[21] Appl. No.: 77,008

[22] Filed: Jun. 14, 1993

Related U.S. Application Data

[63] Continuation-in-part of Ser. No. 758,912, Sep. 10, 1991, Pat. No. 5,219,470.

[51] Int. Cl.⁵ .............................................. B01D 37/00
[52] U.S. Cl. ...................... 210/767; 210/520; 210/528; 210/525; 210/87
[58] Field of Search ............... 210/767, 520, 528, 525, 210/513, 519, 808, 521, 532.1, 87

[56] References Cited

U.S. PATENT DOCUMENTS

| | | | |
|---|---|---|---|
| 3,314,547 | 4/1967 | Kivell | 210/520 |
| 3,487,017 | 12/1969 | Thorn et al. | 210/520 |
| 3,892,666 | 7/1975 | Quast | 210/520 |
| 4,193,877 | 3/1980 | Lillywhite | 210/520 |
| 5,219,470 | 6/1993 | Bradley et al. | 210/767 |

Primary Examiner—Robert A. Dawson
Assistant Examiner—Ana M. Fortuna
Attorney, Agent, or Firm—Skjerven, Morrill, MacPherson, Franklin, & Friel

[57] ABSTRACT

A sludge removal apparatus for a clarifier/thickener tank includes a central rotatable or stationary sealed sludge collection box submerged in the tank and surrounding a vertical, central influent column or support shaft. The collection box is positioned at any elevation between the tank bottom to a position just below the liquid/air level in the tank. At least one rotatable rake arm, preferably one or two pairs of spaced rake arms each having a spiral blade, is affixed to and rotates with the box and a driving cage, to inwardly push or pick-up sludge at the tank bottom for transport to the collection box. A substantially controlled flow of sludge may be provided into the collection box by valved or adjustable gate control through a sidewall opening in the collection box.

24 Claims, 15 Drawing Sheets

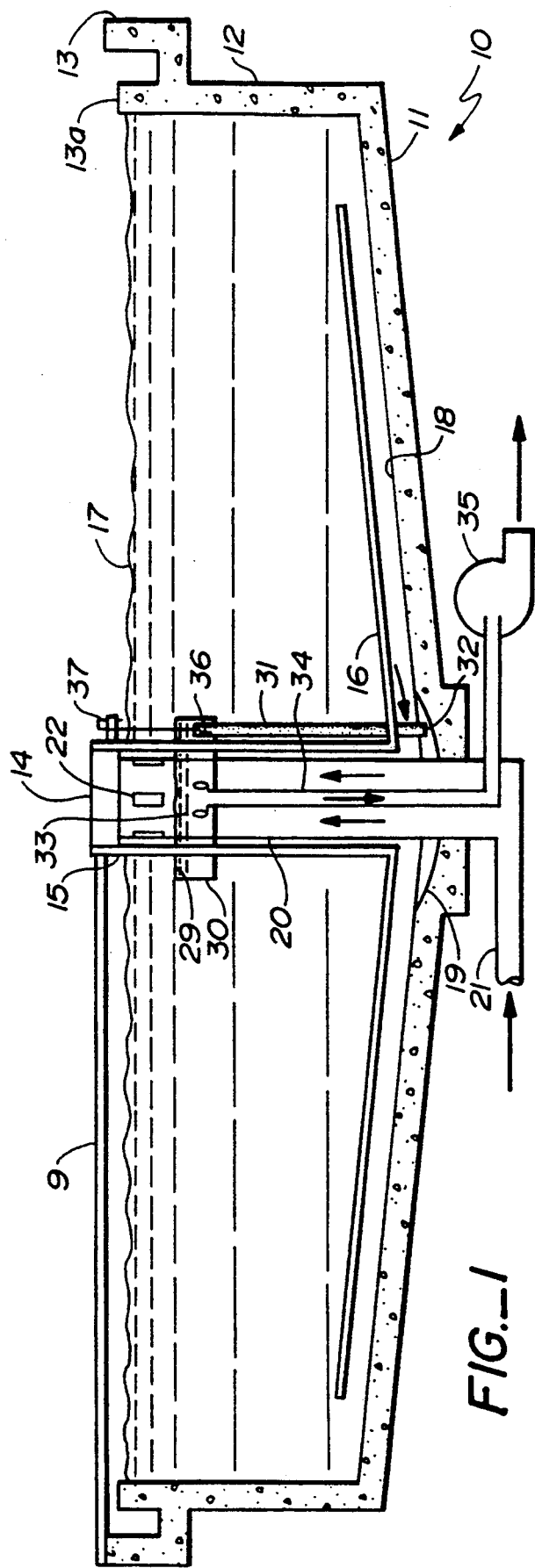
FIG._1

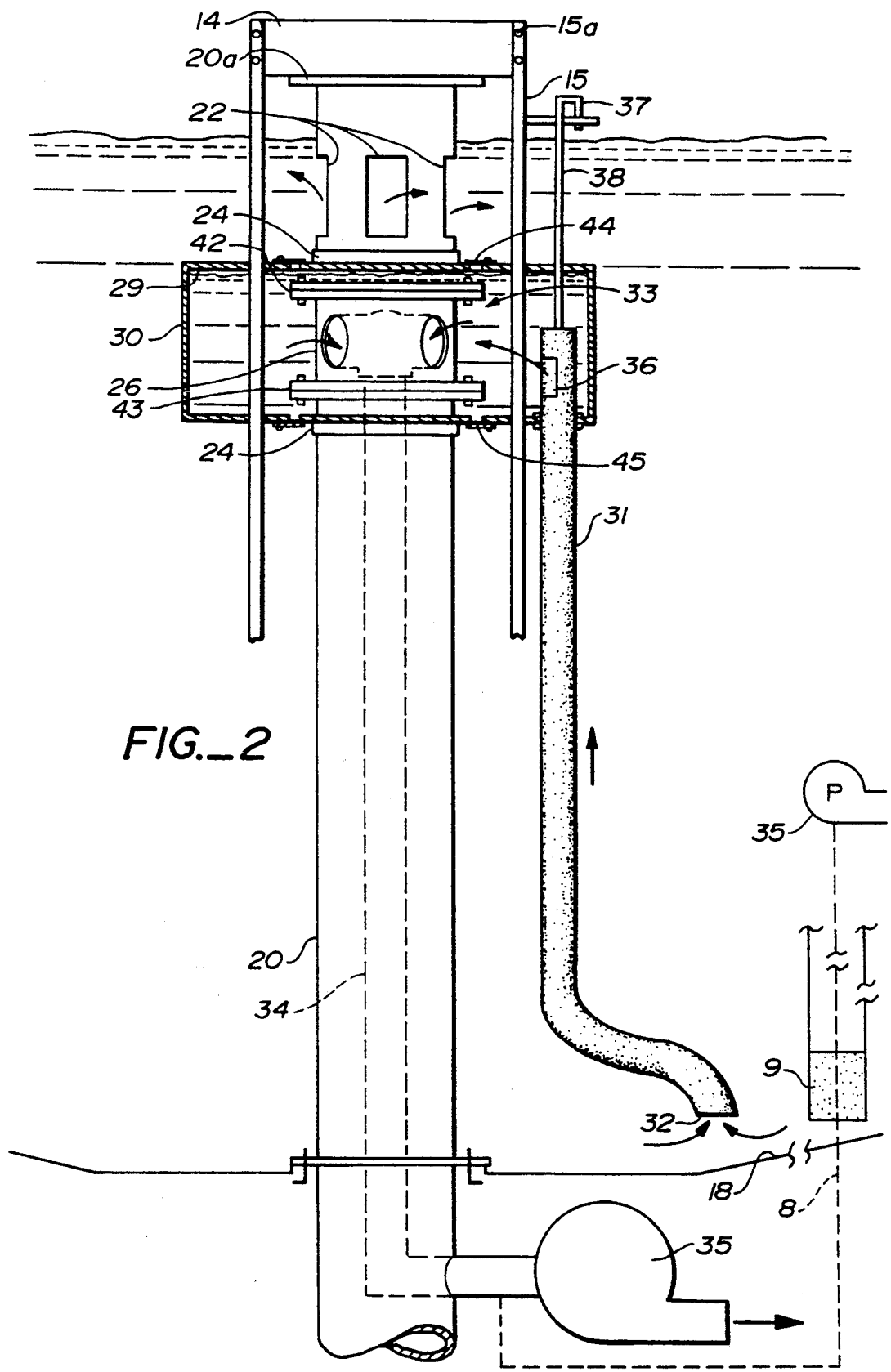
FIG._2

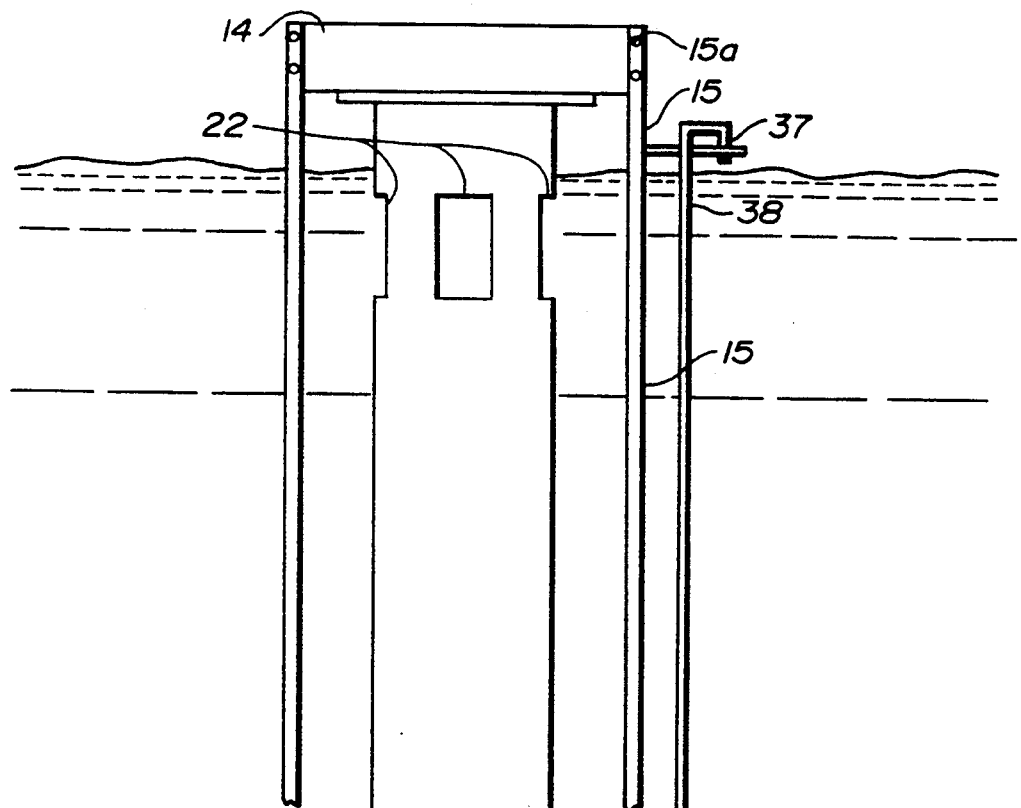
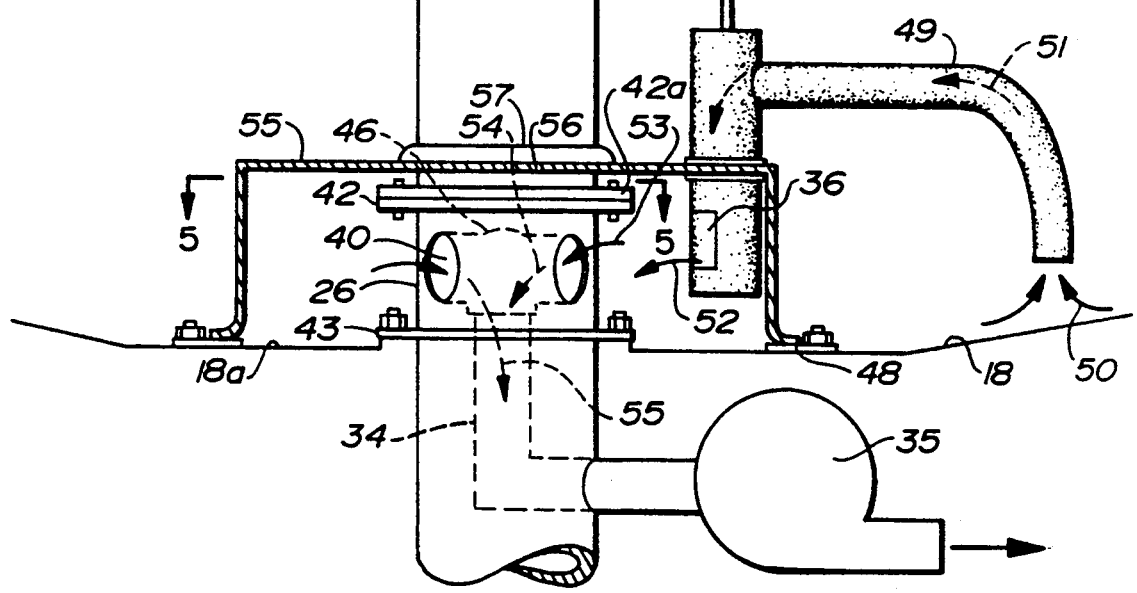
FIG._3

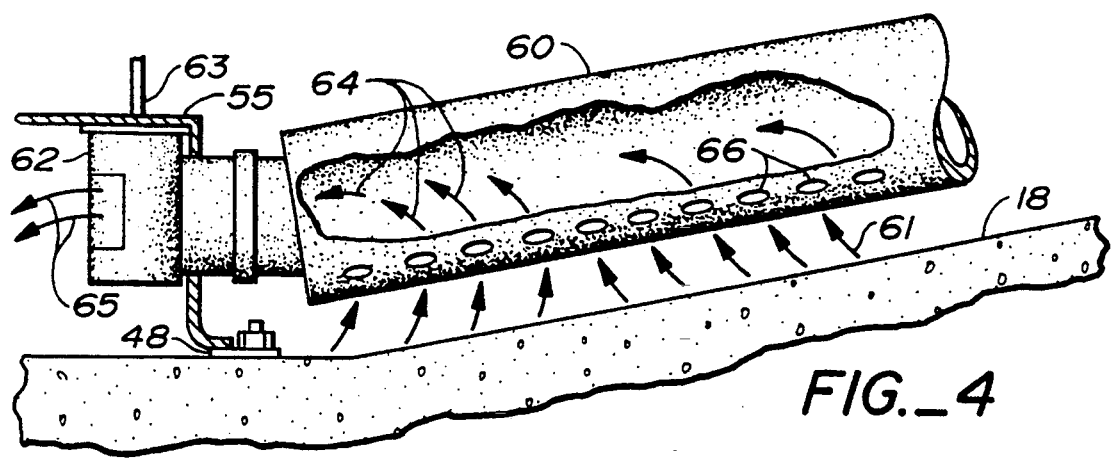
FIG._4
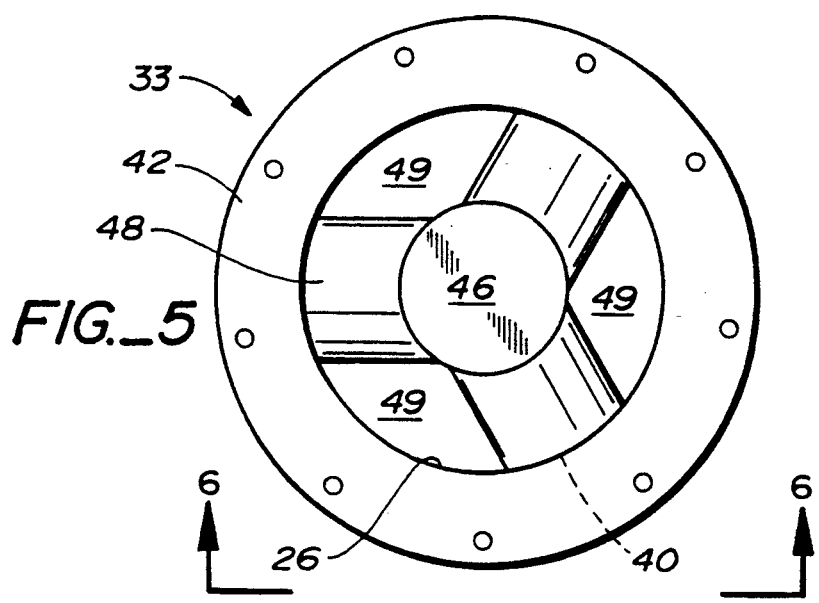
FIG._5
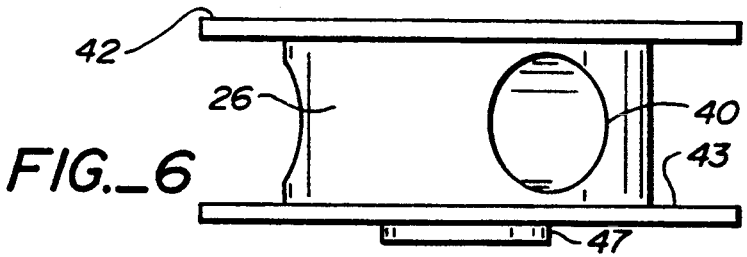
FIG._6

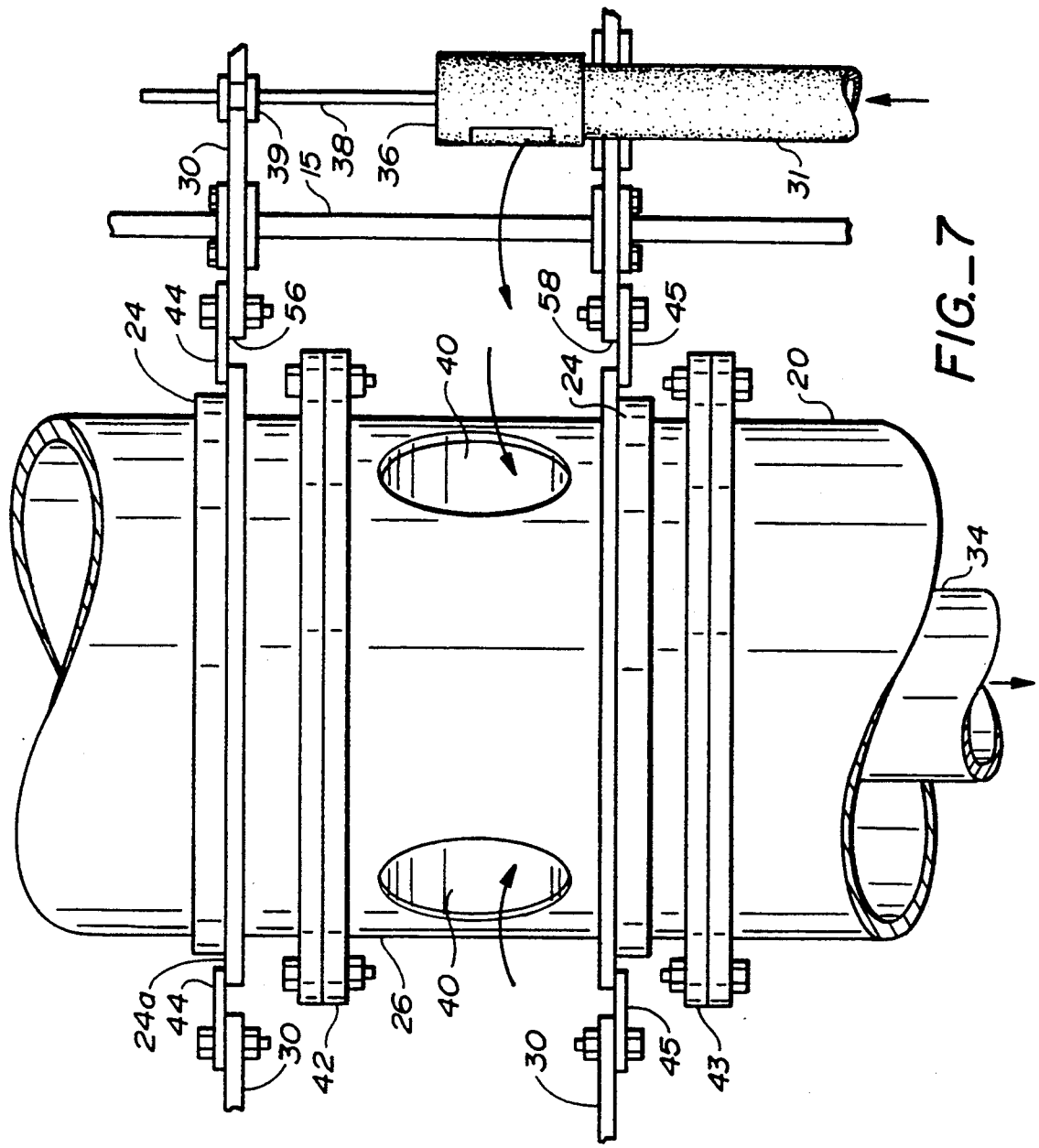
FIG._7

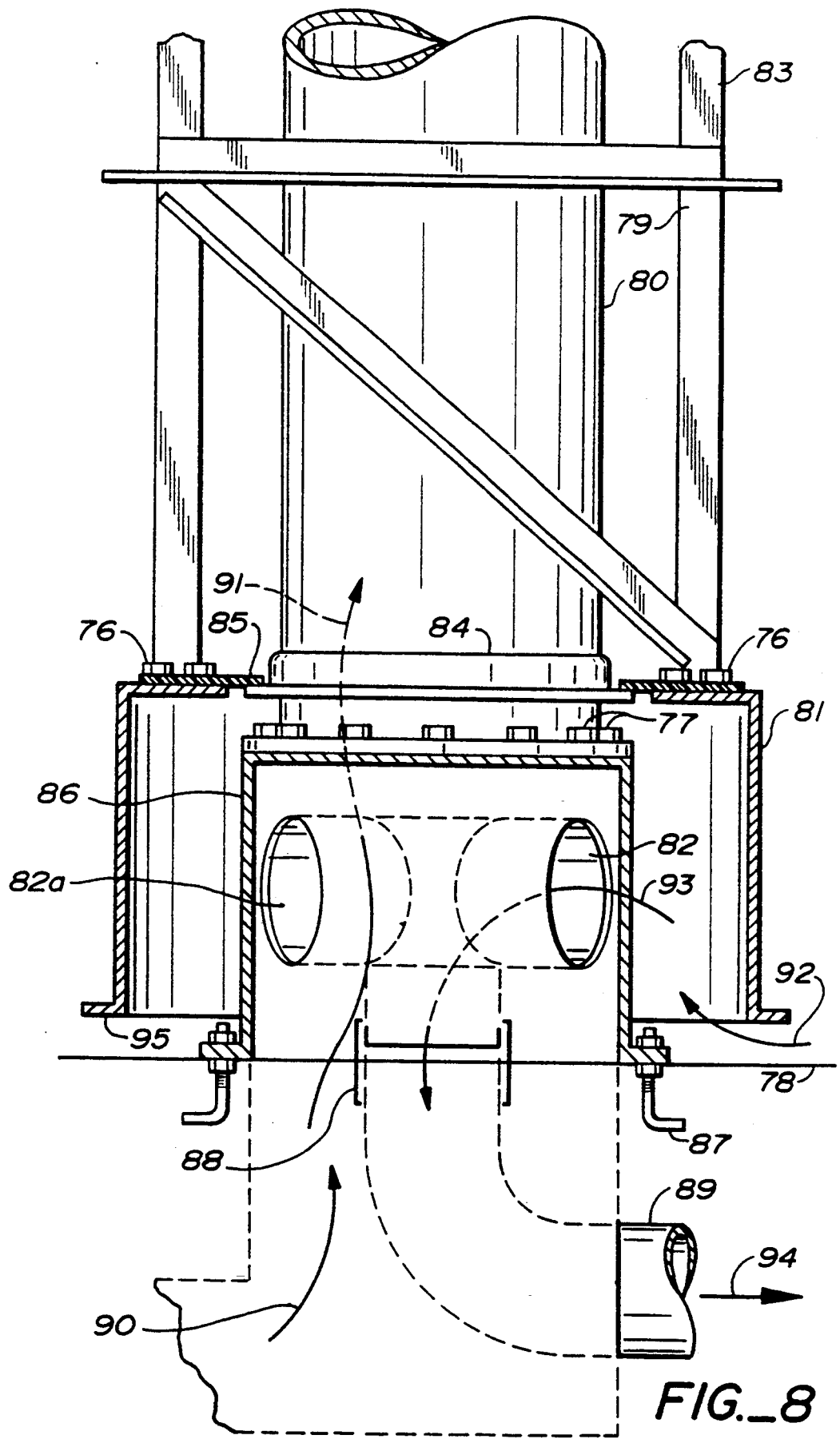

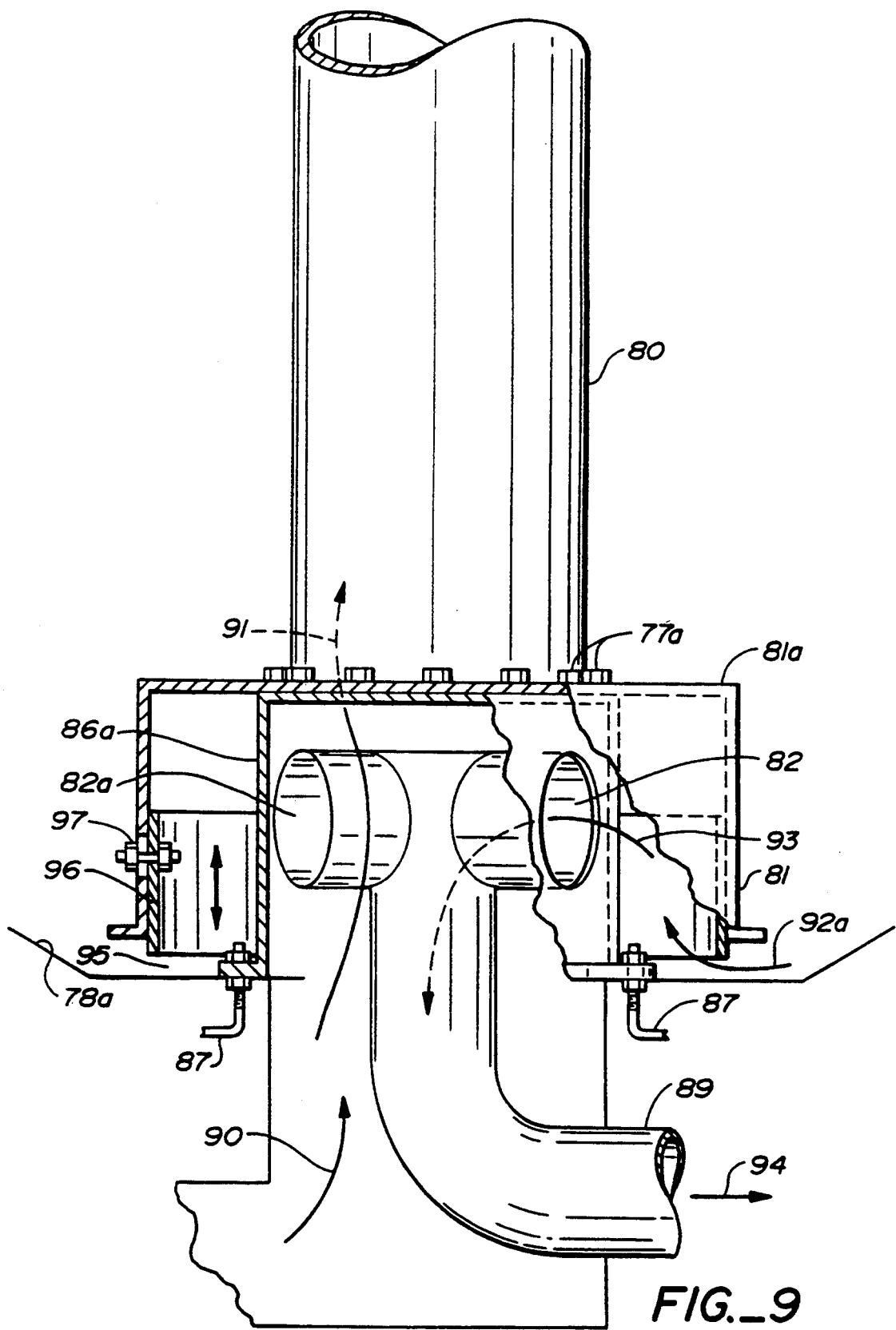
FIG._9

APPARATUS AND METHOD FOR CLARIFIER SLUDGE COLLECTION

CROSS REFERENCE TO RELATED APPLICATION

This application is a continuation-in-part of U.S. application Ser. No. 07/758,912 filed Sep. 10, 1991, now U.S. Pat. No. 5,219,470 issued Jun. 15, 1993.

FIELD OF THE INVENTION

This invention is directed to apparatus and method for removing hydraulic sludge from a clarifier or thickener. More particularly the invention concerns a system of collecting sludge from adjacent the bottom of a clarifier tank and where a continuous or intermittent flow of collected sludge is transported to a sealed submerged collection box and sump or a suction end of a slurry pump.

BACKGROUND OF THE INVENTION

A so-called Sight Well type sludge collection system as seen in prior art and references cited in U.S. Pat. No. 4,193,877 includes an open-top rotatable box generally cylindrical or rectangular in shape which is partially submerged in the tank liquid/solids and surrounds an upper portion of an influent column. The sight well has suction pipes depending therefrom which connect to radial rake arms rotatable to sweep around the tank bottom. A controlled flow of settled sludge is transported by a hydraulic differential force into the open well from whence the sludge moves through inlet ports in the influent column to fall down a sludge pipe, concentrically mounted inside the influent column, to a sump. The sludge normally then is pumped from the sump. While many of these devices have been successfully operated, a problem has existed that at low sludge flows inclusions of air can be sucked into the column sludge inlet ports and into the down pipe which can cause cavitation in the pump or uneven flow into the sump. Also, the open top nature of the sludge sight well allows wind-blown debris or items dropped from the clarifier bridge to foul or obstruct the conduit to the sump or pump suction.

Another prior art construction is termed a Duct-Manifold type collector in which a perforated duct is in communication with a rotating bottomless drum at the center tank bottom, with a sludge withdrawal opening in the concrete tank floor below the drum leading directly into a sludge sump or pump suction. A limitation of this device has been that the duct orifices, which are located at intervals along the arm, and of varying diameters to provide uniform clarifier bottom sludge pickup, are usually of small enough size that settled trash and debris are sucked into the smaller orifices, plugging them and upsetting balanced flow.

Another prior art device known as a Top-Feed type collector as seen in U.S. Pat. No. 4,193,877 includes an open-top collection box forming an influent energy dispersion trough and baffles adjacent to influent windows in an influent column at the liquid/solids level in the tank. The sludge/liquid level in the box is adjustable. Settled sludge is transported upward through draw-off pipes into the box and into an inner concentric pipe in the influent column. Again since the box has an open top, air and trash inclusions can be present in the pumped sludge discharge and pump cavitation or clogging can result.

In both cases of concentric internal sludge discharge pipes, an additional consideration comes into play when the steel parts of the clarifier wear out, and the owner considers replacement with either an identical model, or a newer concept unit. Duplicating the original unit is possible without modifying the tank bottom. However if a Duct Manifold type unit is now wanted, the thick concrete center floor area must be excavated and modified to suit. The present invention makes possible the changeover from an "open top sight well" type clarifier to a "duct manifold" type clarifier, without requiring excavation of existing concrete tank bottom.

Another prior art device offered by several manufacturers is termed the Duct-Sightwell type collector in which a perforated duct near floor level is in communication with an open top sightwell. That sightwell carries the drawback of the open top designs already mentioned.

SUMMARY OF THE INVENTION

The present invention includes a sealed, completely submerged sludge collection box or drum sealed and normally rotating against the stationary center support column. "Sealed" as used herein means a construction where entry of fluids or air or trash, or any material or object, other than settled sludge and its elements drawn from the tank floor, is generally prevented. In clarifiers where the center column also serves as influent column, the present invention allows influent ports to be located at or near the clarifier water surface elevation to create surface movement which will serve to move scum toward feedwell scum ports. The sludge collection box may be located below the influent ports, and differs from the "top feed" design in that the sludge box is submerged and sealed. Air sucking and potential pump damage due to cavitation and/or trash accumulation are thus prevented. Submergence of the box is also an improvement over the sight well design because it assures a constant level of suction head available for sludge discharge pumping equipment.

The elevation of the collection box, closer to the surface as in several of the embodiments, is also an improvement over the duct/manifold design in that sludge box seals can be inspected with brief partial tank draining (versus a total draining of the clarifier to inspect duct/manifold seals). A perforated sludge duct or a number of individual sludge collection pipes can be placed in communication with the sludge box. Optional flow control devices, inside the submerged sludge box, regulate relative sludge flows through the sludge collection pipes. Optional flow control device control rods at the clarifier surface can be adjusted from the clarifier operating platform. Customers can be advised of suggested flow device settings for various flow rate ranges based on empirical testing and/or calculations.

The inside top and bottom of the rotating sludge collection box seals against the stationary vertical clarifier center support column. Sandwiched between upper and lower portions of the center column, located at the same elevation as, and in communication with the rotating sludge box, is a stationary sludge-receiving manifold which in turn communicates with a sludge withdrawal pipe which is concentric inside the center column. The sludge withdrawal pipe exits the bottom center of the clarifier and discharges to an open sump or is connected to a pump outside of the clarifier. The sandwiched stationary sludge-receiving manifold, more particularly the wall cylinder and flanges of a spool piece containing the manifold, is designed to support the upper segment of the center column and all dead and live loads imposed from the clarifier mechanism, drive, platform, and walkway. The sludge receiving apparatus can be located at any elevation ranging from the tank bottom to just below the water surface.

In another embodiment the sealed submerged cylindrical sludge collection box is positioned at the tank bottom surrounding the center column. The collection box includes peripheral side openings just forward of an immediately adjacent up-stream-facing root of inward-raking bottom scraper blades of straight, curved or preferably of a partial spiral shape in top view. The peripheral side openings, one for each scraper blade, each preferably including a gate to adjust the size of the particular opening. The gates are operable by control rods at or above the clarifier water-air interface level surface which rods can be operated from the clarifier operating platform. This construction is applicable to a bottom influent feed or to a top-side feed mechanism or to bridge-supported structures where the entire underwater mechanism including the sludge collection box is hung from an overhead structure such as truss-supported platform. Outlet of the sludge from the sludge collection box can be through a stationary central manifold as seen in the embodiment above or through a sludge ring or port in the clarifier floor which is aligned with apertures or a circular slot in the bottom of the sludge box.

Speed of the scrapers will be dependent on desired sludge removal rates and will ensure fresh sludge is delivered to the zone of influence of the sludge collection box. Scraper height will increase toward the inner end, so solids will not go up over the top of the scraper as the sludge gets deeper toward the center of the clarifier. A spiral blade shape is especially conducive to controlled conveyance of sludge to the center area.

BRIEF DESCRIPTION OF THE DRAWINGS

FIG. 1 is a partial cross-sectional view of a wastewater clarifier with the sludge collection mechanism of the invention positioned around a central axis thereof.

FIG. 2 is a partial elevational schematic view of the collection mechanism positioned at the influent column top with the submerged collection box in cross-section to show the mechanism internals.

FIG. 3 is a partial elevational schematic view of a second embodiment of the collection mechanism located at the tank bottom.

FIG. 4 is a partial elevational schematic view of a third embodiment of the collection mechanism employing a radial, perforated sludge collection duct.

FIG. 5 is a plan view of the manifold spool of the collection mechanism taken on the line 5—5 of FIG. 3.

FIG. 6 is a side elevational view taken on the line 6—6 of FIG. 5.

FIG. 7 is a detailed side view of the connection of the manifold spool to the influent column and the rotating seals of the collector box.

FIG. 8 is partial side elevational and cross-sectional view of a further embodiment of the invention.

FIG. 9 is a partial side elevational schematic view of a further embodiment of the invention.

DETAILED DESCRIPTION

Figure 10:
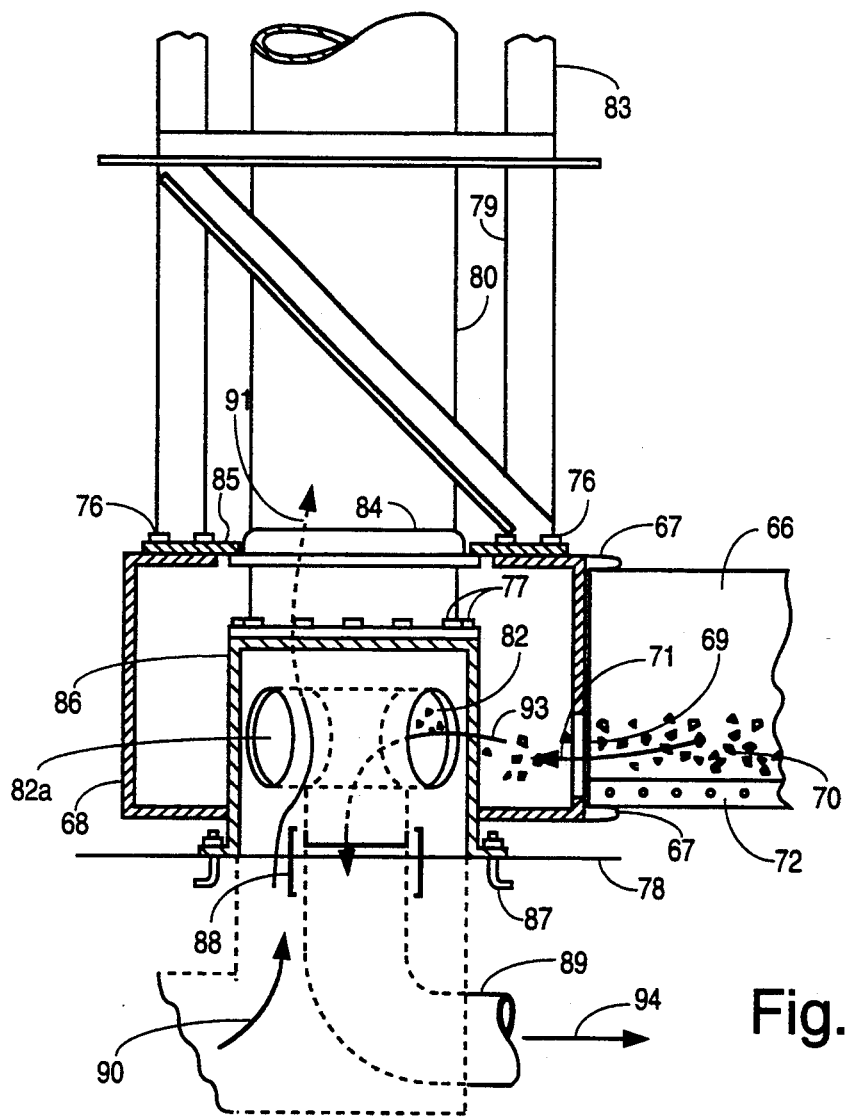
FIG. 10 is a partial side elevational and cross-sectional view of a commercialized embodiment of the invention with a tank bottom influent inlet.

FIG. 1 shows the overall apparatus 10 for sludge collection which employs a conventional clarifier tank 12 having a cylindrical sidewall and a normally inclined tank bottom 11 of concrete or metal construction. Flat-bottomed tanks may also be employed. A peripheral, or segmented or radial overflow trough or launder 13 is provided to collect clarified liquid which flows from the interior of tank 12 over a weir 13a. In normal clarifier operation the liquid-ambient air level 17 is adjacent the top of weir 13a. A stationary access bridge structure 9 extends from the tank periphery to a center drive base 14 at the tank center on which is mounted a conventional drive unit including a motor and gears (not shown) coupled to and rotatively driving a depending cage 15. The cage is comprised of vertical and angularly disposed cross structural members connected to the drive unit and extending to a position just above the floor 18 of the tank. One or more sludge collection arms 16 connected to a lower part of the cage 15 extend radially or spirally from the cage generally parallel to the floor of the tank. Scraper blades (not shown) as known in the art may generally extend from the bottom of each rake arm and urge settled sludge toward the tank center as the rake arms sweep over the bottom tank floor 18. The sludge is collected preferably in a sludge pocket or drain sump 19 over which extend the open end 32 of a suction pipe 31 for removal of the settled and raked sludge.

A center influent/support column 20 is provided, bolted to the concrete floor, surrounded by the drive cage, extending above the level of the weir 13a. A feed inlet pipe 21 transports liquid-solids feed, for example, wastewater previously subjected to a biological treatment process, into the bottom of the column 20. Exit ports 22 distribute the influent feed into the tank just below the liquid level 17. A top flange 20a of the influent center column serves as a mounting surface for the drive housing, which in turn supports the weight of the bridge and platform.

A closed sludge collection box 30 surrounds the center column 20 and is fixedly attached to cage 15 so the box rotates with the cage 15 and rotates the sludge suction pipe 31 depending from the box. The settled sludge is transported up the sludge suction pipe 31, through a sludge flow control valve 36 at the upper end of pipe 31. The sludge fills collection box 30 so that the upper level 29 of the sludge abuts the inside top of the box. This valve is controllable by a valve operator or handle 37 adjacent the bridge 9 and drive base 14. The flow rate of sludge into the manifold assembly 33 within the box 30 is thus controlled. A fixed sludge withdrawal pipe 34 extends downwardly and concentrically within column 20 to a sludge pump 35. The net positive suction head provided from the clarifier water surface elevation also provides a driving force along with the pump suction. In an alternative configuration, the sludge withdrawal pipe 34 may pass radially outward under the tank from the tank center by line 8 to an exterior sump 9 at the tank periphery, with the pump 35 intake extending vertically into the sump to a position adjacent the sump bottom to withdraw sludge from the sump.

FIG. 2 shows the general mechanical connection of cage 15 to a rotating main gear (not shown) by bolts 15a, the gear being driven with respect to the fixed drive base 14. The manifold assembly 33 comprises a fixed spool piece 26 having an upper flange 42 and lower flange 43. The flanges are bolted onto corresponding flanges of sections of the center column 20. Rotational seals 44, 45, constructed of an elastomer such as neoprene available commercially are also seen, which allow for an effective seal of the sludge collection box with respect to collars 24 fixed on the center column. Various configurations of the suction pipe 31 may be employed to most efficiently pick up the settled sludge. In a preferred embodiment, the pipe or duct entrance 32 is positioned about 6 to 10 cm above the tank floor 18.

FIG. 3 illustrates a second embodiment of the invention in which spool piece 26 is mounted by its bottom flange 43 directly to bolts 46 embedded into the tank bottom forming a common bottom wall with a central portion 18a of the tank bottom. Sludge collection box 55 is rotationally sealed to a fixed seal plate or angle 48, also bolted to or embedded in the tank bottom.

The upper flange 42 is mounted to a column flange 42a. A central circular top aperture 56 in the collection box is rotatively sealed by a circular elastomeric seal such as neoprene to a collar 57 fixed to center column 20.

Locating the sludge collection box at the bottom of the tank, under the center column, eliminates friction losses and other head losses which would occur with the box higher up the column. Additionally, with the box located in the tank zone where sludge concentration is greatest, the box, with proper baffling, can be used to suck in sludge directly without intermediate conduits, ducts, or pipes particularly as seen in the FIG. 8 and FIG. 9 embodiments.

A short curved or elbowed suction pipe 49 extends into the top of box 55 and conveys settled sludge from the tank floor (arrow 50) through pipe 49 (arrow 51) and then outwardly (arrow 52) into the box, as flow controlled by valve 36, valve operator 37 and valve adjustment rod 38. The sludge then flows (arrow 53) from a sludge-containing annulus in the box into the entrance 40 of the manifold and into sludge withdrawal pipe 34 (arrow 55) and into the suction end of pump 35 for discharge.

Alternatively, suction pipe 49 can be functionally replaced by up to a multitude of suction pipes. In some cases, these would penetrate the side of the box. In most cases these would rotate at the same speed as the box.

FIG. 4 illustrates a further embodiment of the invention in which the suction pipe is a separate, rotatable perforated sludge duct or part of the inner end of the sludge collecting arm. The arm or perforated sludge duct rotates with sludge collection box 55 and in so doing, sucks up settled sludge through apertures 66 from tank floor 18 as shown by the arrows 61 through the arm 60 (arrows 64) and into the interior of box 55 (arrows 65), as flow controlled by valve 62 operated from above the tank by adjustment rod 63.

FIG. 5 shows a top view of the manifold assembly 33, including a sludge withdrawal pipe top central cap closure 46 and three 120° spaced fixed branches 48 having entrances 40 leading from the sludge collection box (FIG. 3) to the fixed withdrawal pipe. Spaces 49 between the branches allow flow of influent up through the center column. As seen in FIG. 6 a cylindrical stub 47 extends downward from the confluence of the branches 48 for connection to the sludge withdrawal pipe (FIG. 2), normally by a neoprene-lined flexible connector such as a Victaulic or Dresser type, or "no hub" coupling. The flanges 42, 43 as well as the cylindrical wall of the spool piece 26 are designed for supporting the dead and dynamic loads occasioned by the walkway, platform, drive base, drive mechanism and gears mounted on and above the center column.

Flow control device settings for various sludge flow rates may be made based on empirical testing or by calculations. The sludge flow control device 36 is a rotary slip tube valve manufactured by and available from Eimco of Salt Lake City, Utah and designated as a rotary sludge flow control valve.

FIG. 7 illustrates in more detail the circular rotational seals 44, 45 mounted to the edges of aligned central apertures 56, 58 in the sludge collection box 30 and in rotational sliding contact with a flat flange 24a on fixed collars 24 attached to the center column 20. While the spool piece 26 has been shown alternatively positioned at the top and bottom of the center column, it may be positioned intermediate of the column top and bottom. Rod 38 traverses a top wall of box 30 through a grommet 39 of elastomer material such as neoprene available commercially.

FIG. 8 shows a further embodiment of the invention in which a fixed center influent column 80 of a diameter smaller than the diameter of the sludge manifold 86 is fixed to one inward top flange of the manifold by bolts 77. A rotatable cage 83 having vertical and cross truss members 79 extends around the influent column. Rake type collector arms (not shown) may extend from a rotating cage so as to move settled sludge toward the center of tank floor 78. The sludge collection box 81 in this embodiment may be connected by bolts 76 to the cage 83 and rotate therewith or be fixed to the exterior of the influent column 80 adjacent collar 84. The latter construction is seen in FIG. 9. If fixed to and movable with the cage, an elastomeric neoprene seal 85 seals the collection box against a rolled seal angle forming collar 84. The sludge collection manifold 86 is affixed to the tank floor 78 by anchor bolts 87. Floor 78 may be flat or have a positive or negative cone slope. Sludge which settles on floor 78 is pulled in as indicated by arrow 92 to the collection box 81 through a continuous floor-level orifice or annulus 95. The sludge then flows (arrow 93) through entry ports 82a in an inner manifold assembly 82 and into sludge withdrawal pipe 89 as indicated by arrow 94 to a collection sump and/or to a pump. The manifold assembly 82 is stub-connected by a coupling 88 to the withdrawal pipe 89. Incoming wastewater feed enters the influent column at its bottom as illustrated by arrow 90. The feed passes around the exterior of the manifold assembly 82 and up the column (arrow 91) for entry into the overall tank as shown in FIG. 2.

The flanged manifold assembly 82 may be retrofitted to a standard sightwell-type clarifier by removing the old internals from the tank, leaving a center hole in the concrete tank bottom with a sludge withdrawal pipe extending as a stub upwardly therefrom and the center hole surrounded by the old anchors in the concrete floor. Alternatively, new anchors may be used. The new sludge collection manifold assembly 82 is set over the old anchor bolts and coupled to the withdrawal pipe stub and the other parts of the construction erected therearound.

FIG. 9 shows a further embodiment of the invention in which the collector box 81 is attached nonrotatably to the center column 80 by bolts 77a. Tank bottom slope 78a may be designed at a steeper pitch near the center, to assist movement of sludge toward the stationary collection box 81 and manifold 86a. Rakes attached to the rotating cage (not shown in FIG. 9) may also be used to facilitate sludge movement to the collection box zone.

The sludge-receiving orifice 95 of the sealed collection box in this embodiment is the gap between the lower edge of the outer cylinder, and the most proximate ring on the concrete tank floor which floor serves as an integral part of the sealed collection box in this embodiment.

Although normally entirely controlled by external sump level or pumping rate, some local influence over flow, and thus adjustability, may be obtained by equipping the collection box outer or inner cylinder lower edge with a cylindrical ring extension 96 attached with bolts 97 in slotted connections which allow the clarifier or thickener operator to change the vertical height of the collection box annular orifice 95 by moving the ring extension 96 to desired up and down positions, and thus exert an additional control point (at sludge inlet arrow 92a) over the process of sludge collection and withdrawal.

Figure 11:
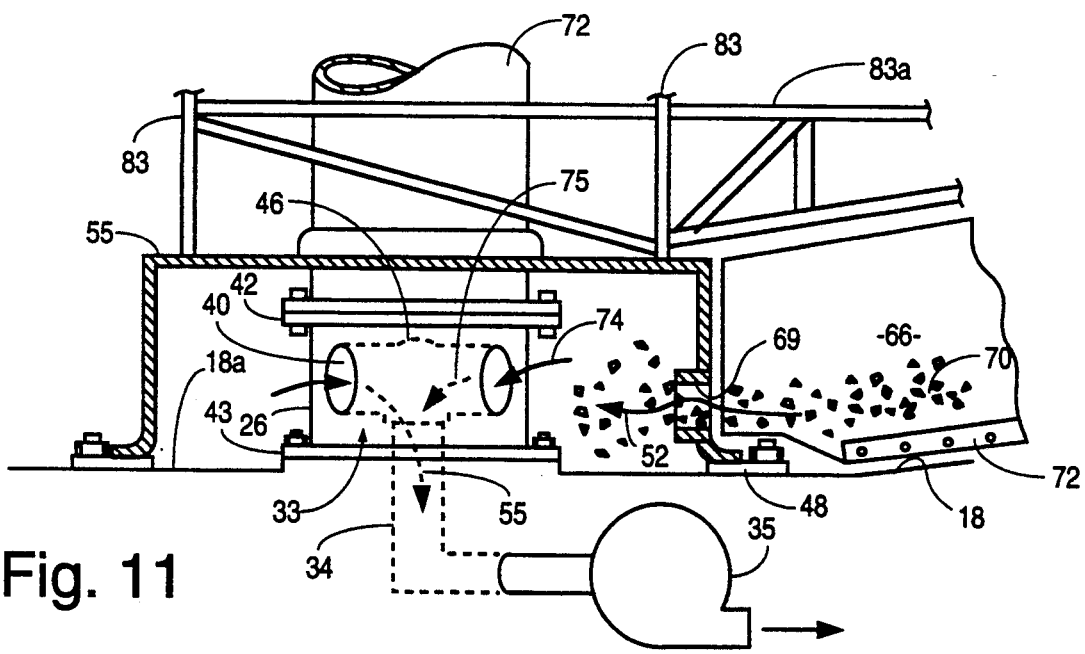
FIG. 11 is a partial side elevational and cross-sectional view of an embodiment with a bottom-closed influent column.
Figure 15:
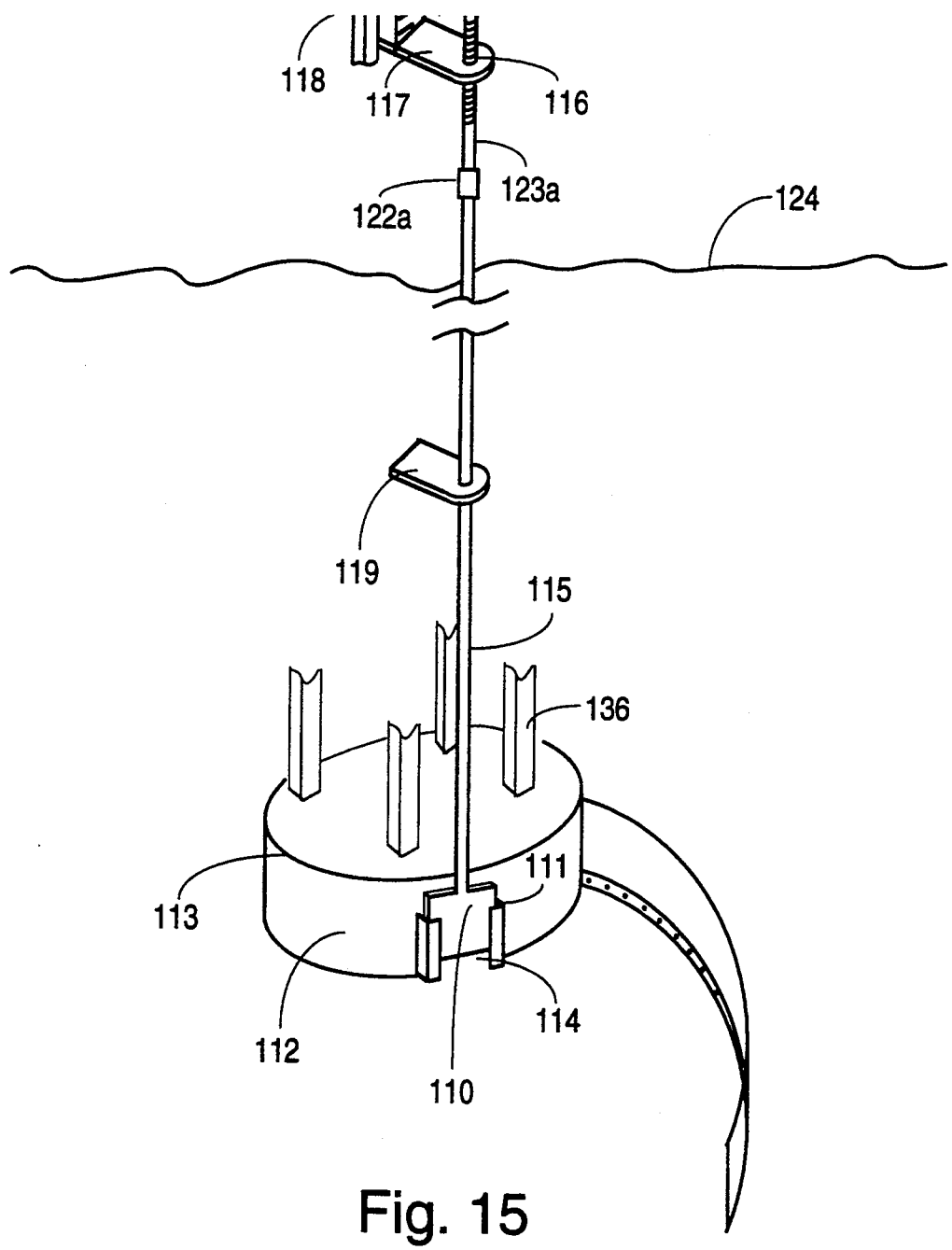
FIG. 15 is a side view of a vertical construction.
Figure 16:
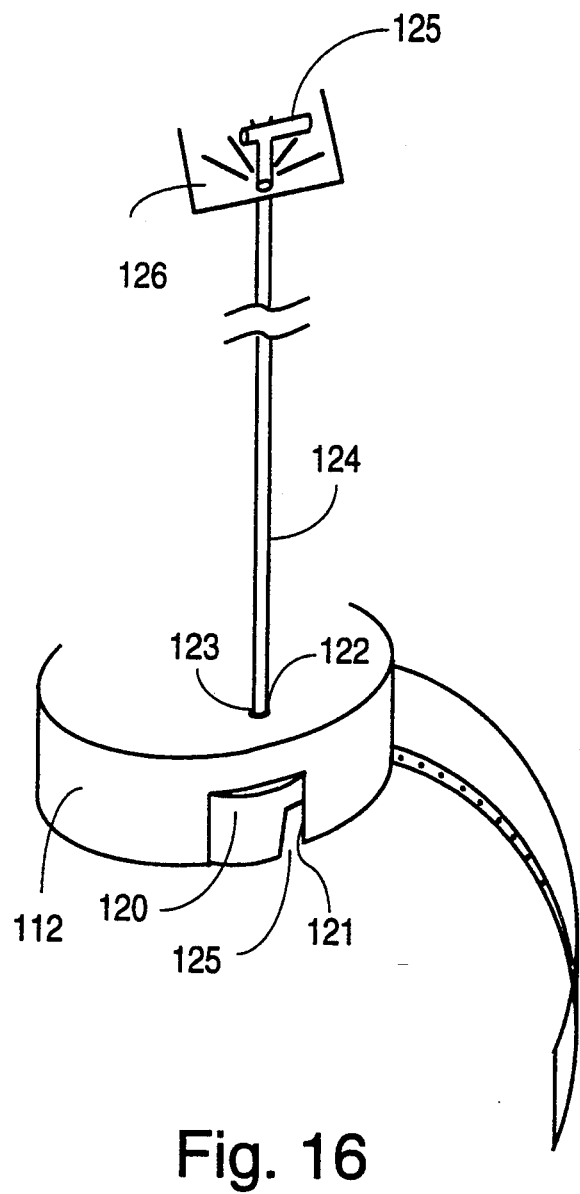
FIG. 16 is a side view of a horizontal gate construction.

FIG. 10 illustrates a further embodiment of the invention in which at least one but preferably two or four rotating rake arms 66 are fixedly pin-attached to lugs 67 extending from the top and bottom periphery of collection box 68. Collection box 68 is rotatedly driven by drive cage 83. The collection box 68 has a number of side openings 69 each positioned immediately downstream from a corresponding advancing blade, such that sludge material 70 is pushed or drawn into the collection box 68. The side openings may be fixed in size or adjustable by means of an adjustable gate (FIG. 12) connected to a rod or cable linkage, so as to be accessed at the liquid/ambient air level at the operator platform 9 of the clarifier 10 (FIG. 1). FIGS. 15 and 16 show various embodiments of gate and gate operator constructions. The sealed submerged collection box 68 is placed at the lower end of influent column 80 to surround the column is in FIG. 8. Sludge is scraped to the vicinity of the collection box 68 by inward - raking scrapers of straight, curved or preferably spiral configuration in plan view. Just ahead of the point where each scraper blade meets the generally cylindrical collection box, sludge collected by each blade is brought into position to be pushed into and drawn into an adjacent collection box opening 67 by the rake movement and intake suction of a sludge pump 35 (FIG. 11). A rake scraper squeegee 72 of stainless steel, brass or neoprene may be attached to the bottom of blade 66 which squeegee rides on or just above the tank bottom surface 78. A bottom influent feed stream 90 and a fixed central sludge distributing sludge manifold 82 are utilized as in the FIG. 8 embodiment.

Speed of the scrapers will be dependent on desired sludge removal rates and will ensure fresh sludge is delivered to the zone of influence of the sludge collection box. Scraper height will increase toward the inner end, so solids will not go up over the top of the scraper as the sludge gets deeper toward the center of the clarifier. Spiral blade shape is especially conducive to controlled conveyance of sludge to the center area. The inwardly-raked sludge material 70 is shown by arrows 71, 93 and 94 as being conveyed to discharge from the clarifier/thickener.

In the FIG. 11 embodiment a sludge withdrawal manifold assembly 33 including spool piece 26 is fixedly connected to the tank bottom 18 by flange 43. An influent pipe 72 extends thereabove with a side opening(s) or top opening for inflow of tank feed. A drive cage 83 having a truss rake support arm 83a is fixed to the top of collection box 55 and rotatably drives the box simultaneously with the rake support arm 83a and the rakes 66 depending therefrom, with respect to the tank bottom 18. Inwardly-raked sludge 70 is passed into box 55 and discharged through vertical sludge pipe 34 by sludge pump 35 as shown by arrows 52, 74, 75 and 55.

Figure 12:
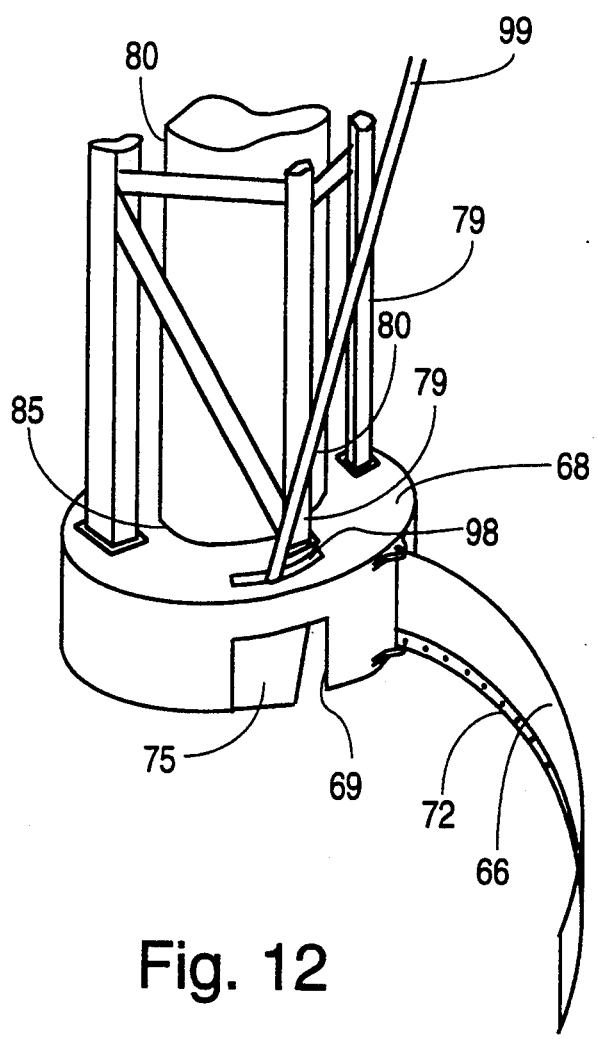
FIG. 12 is a detailed perspective schematic view of a collection box with a side sludge input opening and a curved scraper blade.

FIG. 12 shows more clearly the spiral nature of blade(s) 66 and squeegee 72 and its position with respect to the collection box 68 side opening(s) 69. In the adjustable variant of the opening a positively-driven hinged gate 75 may be positioned to give variously sized openings 69 by turning rod 99 which extends through a sealed slit 98 in the top of the collection box. A drive connection is provided typically by a rotary worm gear on the rod end and a spur gear on the hinged gate, such gearing movably joining the rod and gate.

FIG. 15 illustrates a vertical gate 110 operable from a tank walkway. The curved gate 110 is guided by angle guides 111 positioned vertically on a circular peripheral surface 112 of collection box 113 or at an angle if a trapezoidal opening 114 into the collection box as desired. A slotted guideway which adapts to the arc of the collection box surface 112 may also be used in which event a non-curved gate 110 may be used. The collection box is supported by cage member 136. An operating rod 115 extends upward from the gate to a threaded opening 116 in an angled bracket attached to the drive cage 118. The rod 115 acts as a rising valve stem to set the gate opening 114 at a desired level with respect to the bottom of the collection box. An intermediate non-threaded apertured guide bracket 119 may be utilized if required by the length or torque of rod 115 or if required in opening and closing gate 110. The rod 115 has an upper T-handle 120 which can be manually turned or turned by a simple tool to adjust the gate opening. An indicia pad 121 can be affixed to bracket 117 to visually indicate by pointer 125 the percent opening of the gate e.g. 25%–50%,–75%. A swivel union connector 122 may also be employed between the threaded handle portion 123 and the lower rod 115. The bracket, threaded handle portion and union connector are all positioned above the wastewater level 124 in the tank.

In FIG. 16 a circular arc gate 120 is employed which is movable in a horizontal plane on the inner circular side 121 of collection box and guided by guides (not shown) on the inside periphery of the collection box. An opening 122 is provided in the collection box top with a rotary seal 123 through which rod 124 can rotatively pass. As in FIG. 15 a threaded handle is turned to open to various degrees or close opening 125 and an indicator pad 126 included to indicate the percent "open" of the gate.

Figure 17:
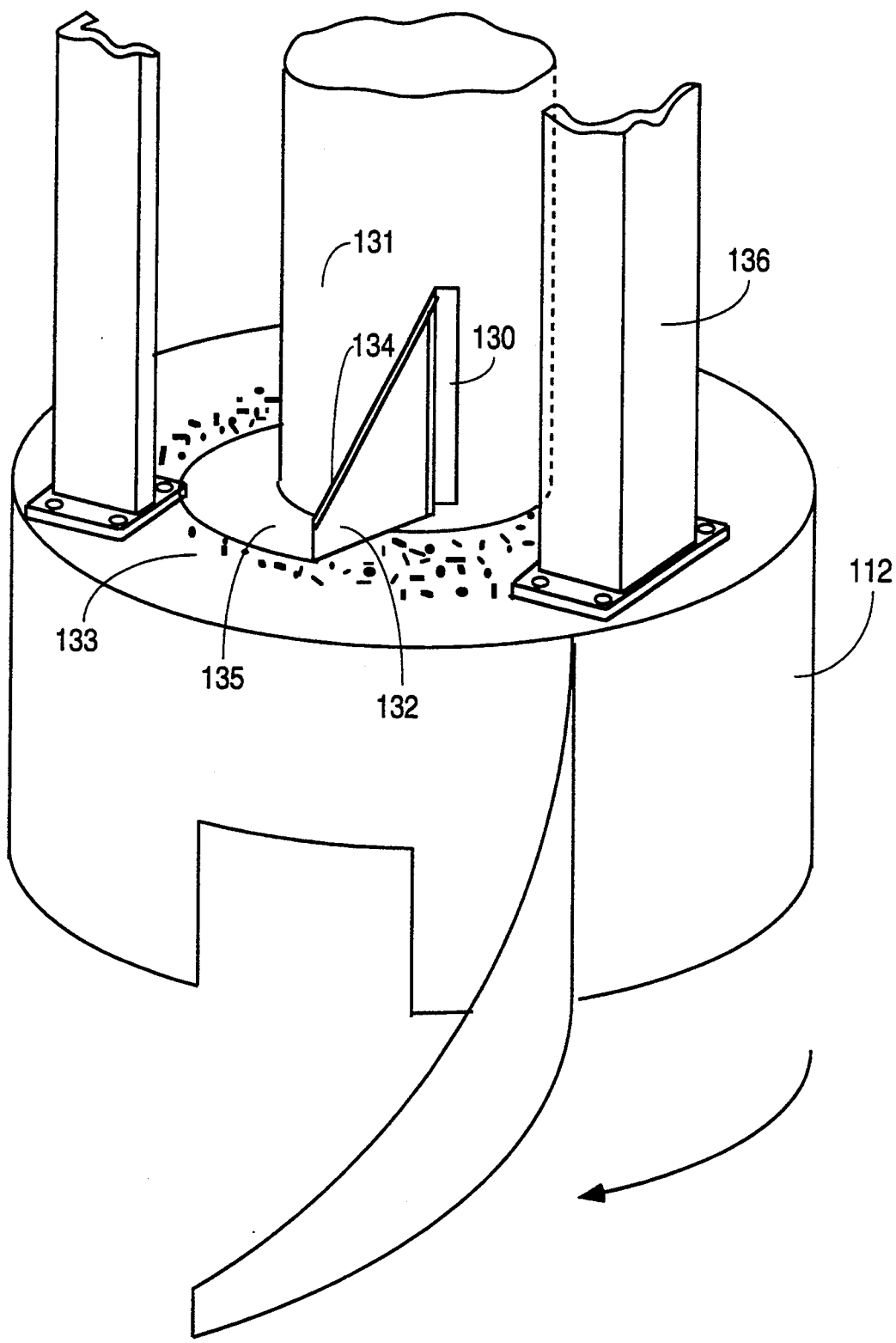
FIG. 17 is a schematic perspective view of a collection box and column with a column-attached wiper for cleaning the collection box top.

FIG. 17 shows a bracket 130 welded to a center column 131 and having a flexible wiper 132 attached to a stiffener 134 affixed to bracket 130. The wiper is positioned to sweep settled sludge in an annular band 135 around the top 133 of collection box 113 which is supported by cage members 136.

Figure 18:
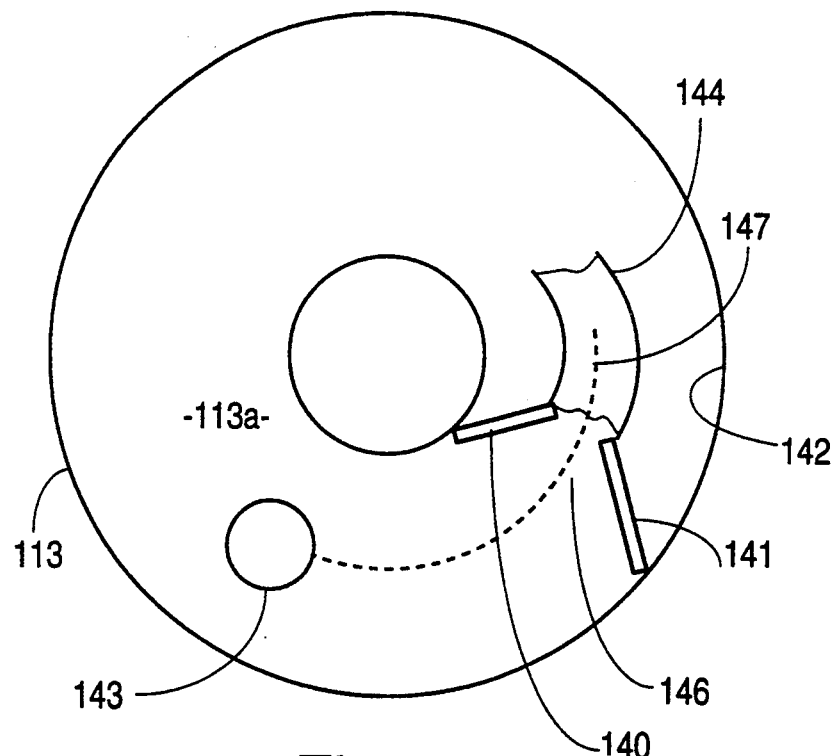
FIG. 18 is a top view of the collection box bottom showing internal wipers in the collection box. 10
Figure 19:
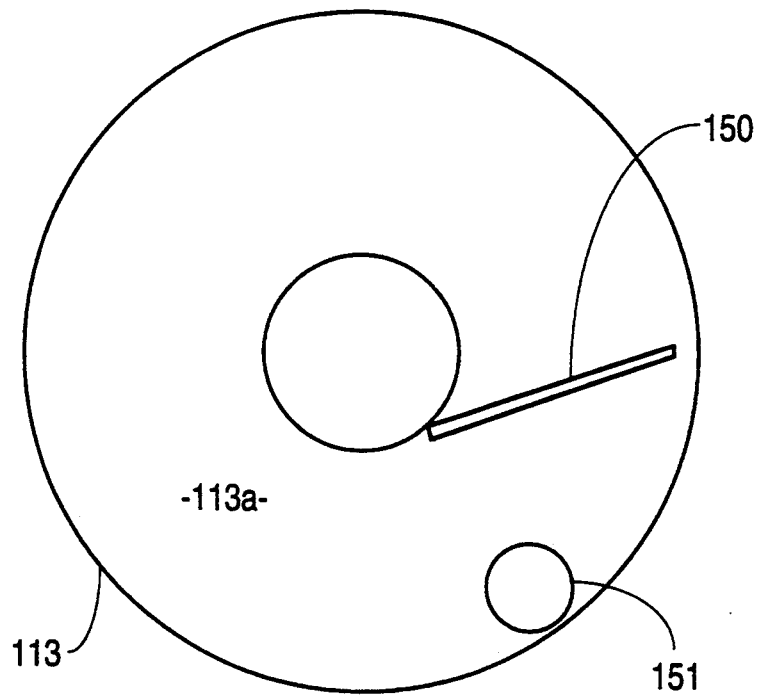
FIG. 19 is a top view of the collection box bottom showing second wiper embodiment.

FIG. 18 shows a pair of wiper blades 140 and 141 hanging from the underside of the collection box and extending to the box bottom 113a. Wiper 141 may also be attached to the inside circular side wall 142 of the box. As the collection box rotates the stiff, relatively rigid, wipers push settled sludge ahead to direct the sludge into a narrow sludge row 146 and thence into a sludge withdrawal hole 143 or circular trench 144 in the collection box opening. In using hole 143 the wipers 140 and 141 are joined to form a —V—, aligned with the hole 143 along dotted line 147. In FIG. 19 a single rotating wiper 150 is employed which moves settled sludge into a sludge withdrawal hole or pipe 151 accessing the collection box bottom 113a.

Figure 20:
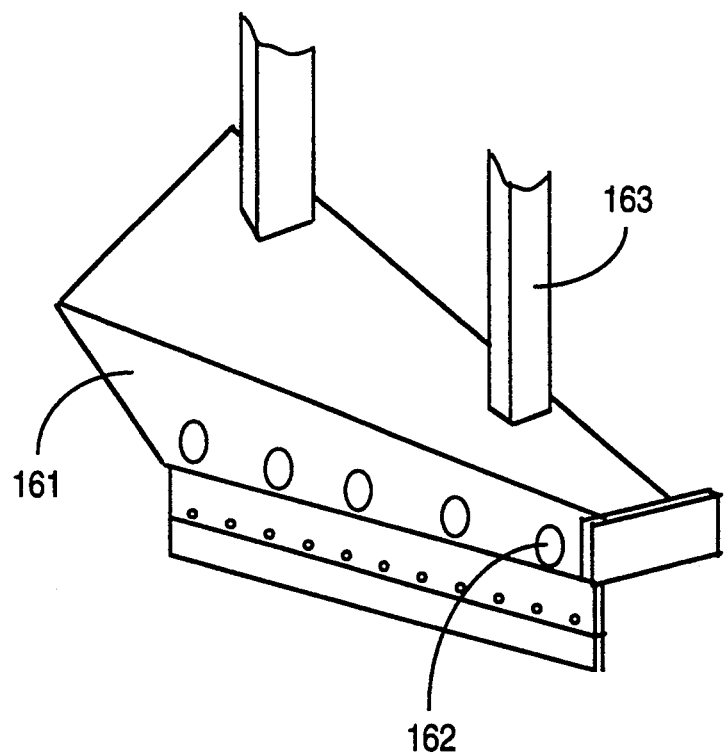
FIG. 20 is a perspective view of a sludge collection dust having a bottom wiper.

FIG. 20 shows a refinement of the duct per se of FIG. 4 where a conventional sludge collection duct per se 160 is of an elongated tapered diamond cross-section shape having trapezoidal side sections 161. Sludge pickup orifices 162 are conventionally provided in a section 161, from which depends a conventional Neoprene squeegee, which rotates along a tank bottom, for directing settled sludge into the orifices. The duct 160 is supported by truss arm supports 163.

Figure 13:
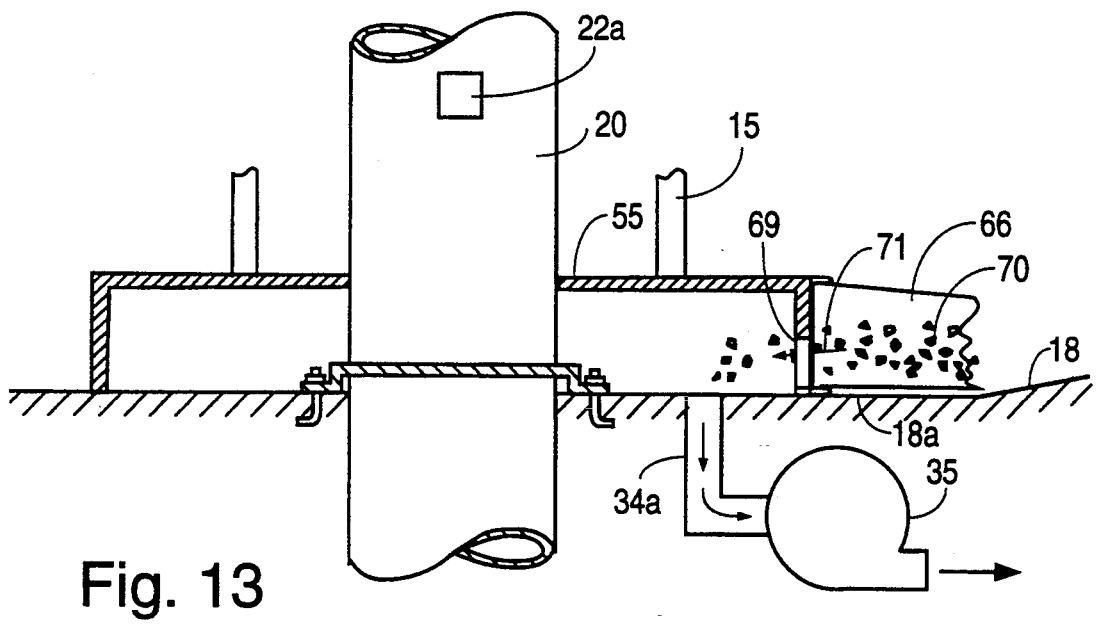
FIG. 13 is a partial side elevational and cross-sectional view of a bottom influent feed embodiment without a sludge manifold.

FIG. 13 represents a further embodiment of the invention in which an influent column 20 extends through and up from the tank floor 18, 18a with influent being discharged into the tank through opening 22a, or as seen in FIG. 3 in the tank column. The drive cage 15 rotates collection box 55. Rake arms 66 attached to the collection box push collected sludge material 70 inwardly into collection box side opening(s) 69 (arrow 71) and the collected sludge is discharged through pipe 34a in a vertical aperture of tank floor 18a offset from the collection box and the influent column vertical central axis. Pump 35 assists in positively flowing sludge from the submerged closed collection box 55.

Figure 14:
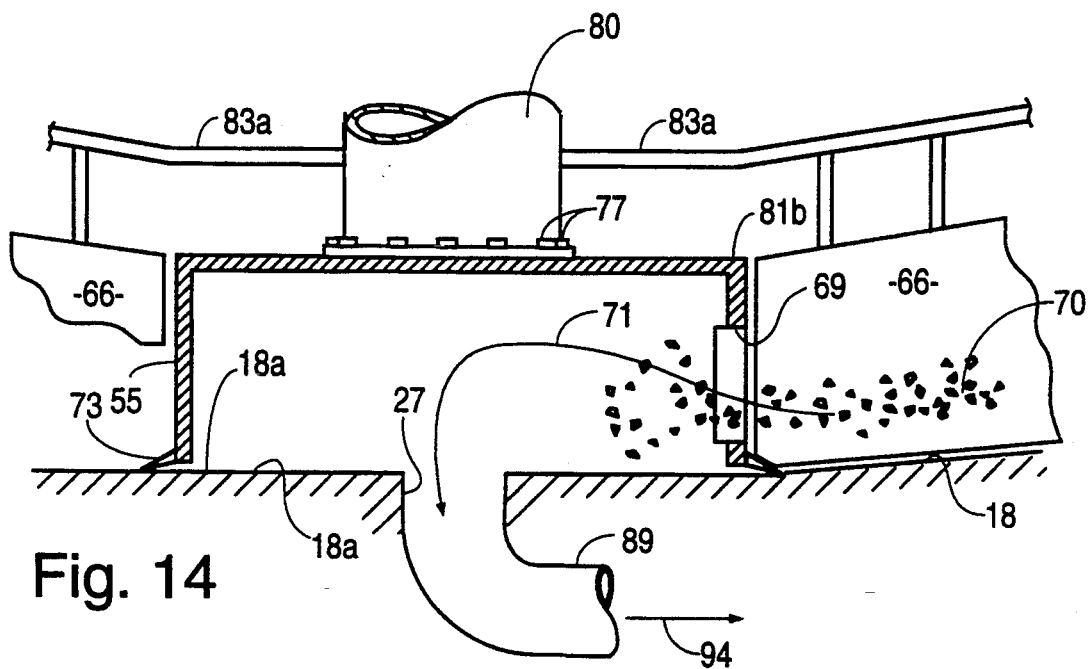
FIG. 14 is a partial side elevational and cross-sectional view of an embodiment where the collection box and rakes are hung from an overhead structure.

In the FIG. 14 embodiment, influent enters into the tank at a position above the collection box. The collection box 55 is positioned in sealing submerged position over a tank sludge discharge outlet 27 including a pipe extension 89. Truss 83a is fixedly attached to support column 80 which functions as a center shaft and supports spiral rake arms 66. The column, truss and rake arms depending therefrom rotate with respect to tank floor 18, 18a and move collected sludge 70 through box opening(s) 69 and into central discharge pipe opening 27. A lip seal 73 made of neoprene may extend from the bottom periphery of the collection box to seal the box to the tank floor central section 18a. This embodiment may be used to retrofit a central sludge sump-containing existing clarifier tank with the submerged collection box and spiral rakes.

The above description of embodiments of this invention is intended to be illustrative and not limiting. Other embodiments of this invention will be obvious to those skilled in the art in view of the above disclosure.

We claim:

1. A sludge removal apparatus for a clarifier/thickener comprising:
   a clarifier/thickener tank having a sludge-receiving tank bottom;
   a support column extending upwardly from said tank bottom;
   a sealed closed-top sludge collection box submerged in said tank, said collection box extending from said support column and being positioned above said tank bottom;
   means extending from a position adjacent said tank bottom to said collection box for transporting settled sludge adjacent said tank bottom to said collection box such that in operation said transported settled sludge fills said collection box and the upper level of the transported settled sludge abuts the inside of the closed-top of the collection box;
   a sludge withdrawal pipe having an opening accessing the interior of said collection box; and
   means constructed and arranged in flow connection to said collection box for removing sludge from said collection box through said withdrawal pipe.

2. The apparatus of claim 1 wherein said means for transporting collected sludge comprises at least one rake arm and wherein said collection box includes at least one side opening for receiving sludge collected by said at least one rake arm.

3. The apparatus of claim 2 in which said at least one side opening is immediately adjacent a sludge-collecting root surface of said at least one rake arm.

4. The apparatus of claim 2 further comprising flow control means constructed and arranged for controlling the flow of transported settled sludge through said at least one side opening.

5. The apparatus of claim 4 wherein said flow control means comprises a rotary gate valve in said side opening openable to said collection box and adjustable from a position above a liquid/ambient air level in said tank.

6. The apparatus of claim 2 in which said at least one rake arm is at least one pair of spaced rake arms and said at least one side opening is at least one pair of spaced openings, one of said openings being adjacent to one of said rake arms and the other of said openings being adjacent to the other of said rake arms.

7. The apparatus of claim 2 in which said at least one rake arm comprises a spiral rake blade inwardly forcing settled sludge into said at least one side opening.

8. The apparatus of claim 1 wherein said means for removing sludge comprises a sludge manifold, said withdrawal pipe being constructed and arranged concentrically within said support column; and wherein said support column, said withdrawal pipe, and said sludge manifold are fixed together in a stationary position and said collection box rotates in said tank.

9. The apparatus of claim 1 said means for removing sludge comprising pump means having a suction end attached to said withdrawal pipe for pumping settled sludge from said tank bottom to said collection box and through said sludge withdrawal pipe.

10. The apparatus of claim 1 wherein said collection box is positioned substantially adjacent to said tank bottom, a portion of said tank bottom forming a common bottom wall of said collection box.

11. The apparatus of claim 10 further comprising a side opening in said collection box for receiving the settled sludge from said means for transporting said settled sludge.

12. The apparatus of claim 11 in which said means for transporting collection sludge includes a rake blade constructed and arranged to collect settled sludge and inwardly transport said settled sludge through said side opening into said collection box.

13. The apparatus of claim 1 in which said means for transporting collected sludge comprises a collection duct extending outwardly from said collection box, said duct having side orifices through which settled sludge is conveyed.

14. A sludge removal apparatus for a clarifier/thickener comprising:
 a clarifier/thickener tank having a sludge-receiving tank bottom;
 a central vertical influent column extending upwardly from said tank bottom and having influent exit ports at an upper column portion for discharging influent into said tank;
 means for raking settled sludge from said tank bottom toward a tank bottom central collection area;
 a sludge withdrawal pipe positioned substantially concentrically within said influent column;
 a submerged sealed sludge collection box extending over said sludge withdrawal pipe; and
 wherein said means for raking is constructed and arranged in flow connection from said tank bottom central collection area to said collection box and into said withdrawal pipe for removing sludge from said tank bottom central collection area to said withdrawal pipe.

15. The apparatus of claim 14 further comprising a suction pump connected to said withdrawal pipe for sucking sludge collected in said collection box and into said withdrawal pipe.

16. The apparatus of claim 14 in which said means for raking includes a rotary cage surrounding said influent column and at least one rake arm attached to said cage for transferring collected sludge to said sludge collection box.

17. The apparatus of claim 14 wherein said means for raking comprises a spiral rake blade inwardly transporting settled sludge to a side opening in said collection box.

18. The apparatus of claim 14 wherein said collection box is a rotating collection box, and wherein said influent column includes a wiper blade attached thereto and positioned to wipe settled sludge off an annular band of a top side of said rotating collection box.

19. The apparatus of claim 14 including at least one wiper blade in said collection box to push settled sludge in said collection box into said sludge withdrawal pipe.

20. A sludge removal apparatus for a clarifier/thickener comprising:
 a clarifier/thickener tank having a sludge-receiving tank bottom;
 an influent column extending upwardly from said tank bottom and having influent exit ports for discharging influent into said tank;
 a sealed sludge collection box submerged in said tank, said collection box surrounding said influent column and being positioned between said tank bottom and said influent exit ports;
 rake means extending from a position adjacent said tank bottom to said collection box for transporting settled sludge adjacent said tank bottom to said collection box;
 a sludge withdrawal pipe within said influent column;
 means constructed and arranged in flow connection between an interior of said collection box and said withdrawal pipe for removing sludge from said collection box to said withdrawal pipe;
 wherein said means for removing sludge comprises a sludge manifold, said withdrawal pipe being constructed and arranged concentrically within said influent column;
 wherein said influent column, said withdrawal pipe, said sludge manifold are fixed together in a stationary position and said collection box rotates in said tank; and
 wherein said sludge collection box includes at least one side opening for receiving settled sludge from said rake means.

21. The apparatus of claim 20 in which said rake means comprises a series of spiral rake blades extending outwardly from adjacent a series of side openings in said collection box.

22. A method of collecting sludge which has settled on a bottom of a clarifier/thickener tank comprising:
 providing a submerged sealed closed-top sludge collection box in said tank, said collection box having a sludge inlet;
 rotating said collection box in said tank;
 conveying settled sludge from the tank bottom to said collection box sludge inlet; and
 withdrawing sludge from said collection box.

23. The method of claim 22 further comprising raking settled sludge on the tank bottom into the collection box inlet.

24. The method of claim 22 wherein said withdrawing step comprises sucking the sludge from the collection box by a suction pump.

* * * * *